United States Patent [19]

Sarasohn

[11] Patent Number: 4,612,811
[45] Date of Patent: Sep. 23, 1986

[54] TEMPERATURE COMPENSATING PRESSURE GAGE

[75] Inventor: Niel L. Sarasohn, Felton, Calif.

[73] Assignee: Gentran, Inc., Sunnyvale, Calif.

[21] Appl. No.: 745,306

[22] Filed: Jun. 14, 1985

[51] Int. Cl.$^4$ .......................... G01L 7/08; G01L 9/04; G01L 19/04
[52] U.S. Cl. ........................................ 73/706; 73/708; 73/726
[58] Field of Search ................. 73/706, 708, 726, 727

[56] References Cited

U.S. PATENT DOCUMENTS 3,600,949  8/1971  Delft ..................................... 73/706

FOREIGN PATENT DOCUMENTS 1936528  1/1971  Fed. Rep. of Germany ........ 73/708

Primary Examiner—Donald O. Woodiel
Attorney, Agent, or Firm—Flehr, Hohbach, Test, Albritton & Herbert

[57] ABSTRACT

A pressure gage particularly suitable in a variable temperature environment includes a body carrying two force rods. One of the force rods is coupled to the source of pressure to be measured while the second, of similar length and parallel to the first, is separated from the pressure to be measured. The total strain on both rods is affected by the same factors except that the rod coupled to the source of pressure is also affected by that source of pressure. When the strain of the two rods are subtracted the resultant strain is attributed only to the measured pressure.

5 Claims, 6 Drawing Figures

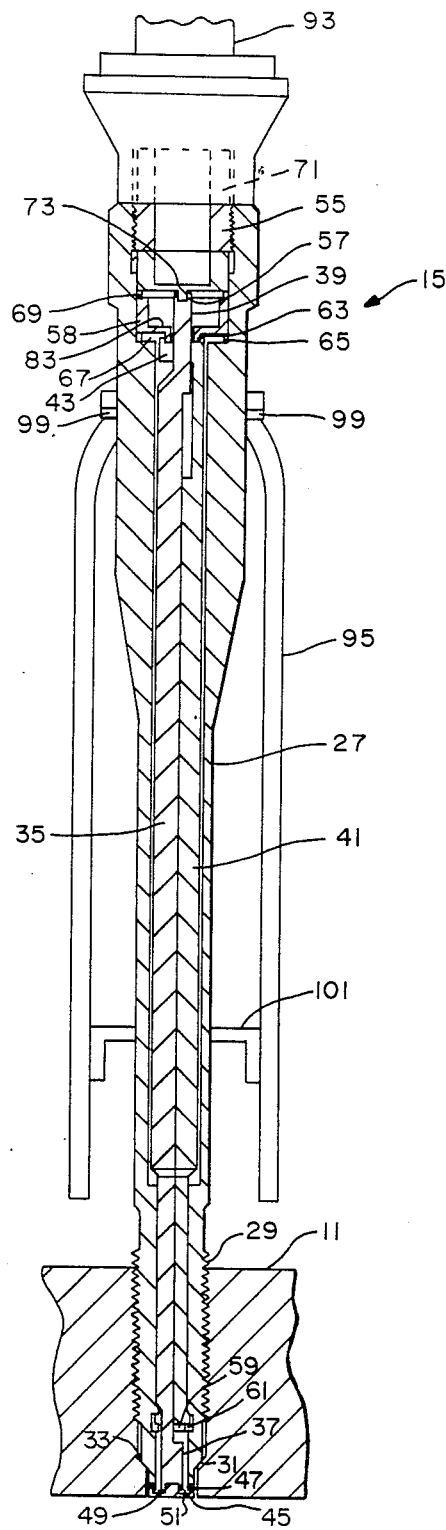
FIG.—2
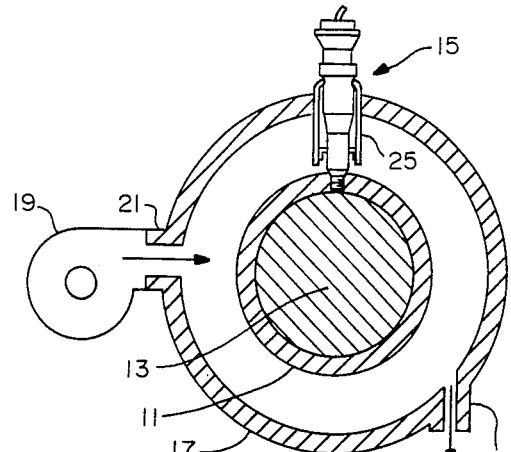
FIG.—1
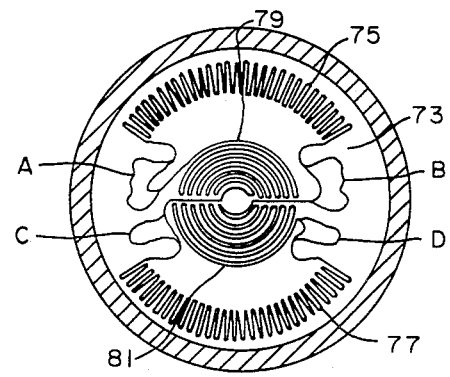
FIG.—3
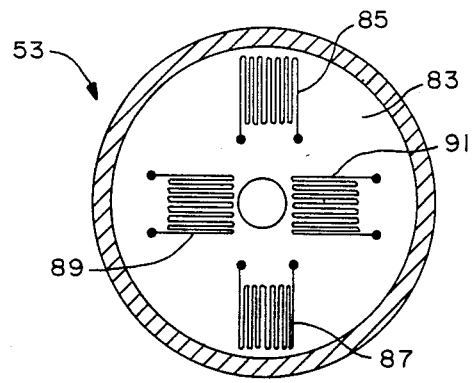
FIG.—4

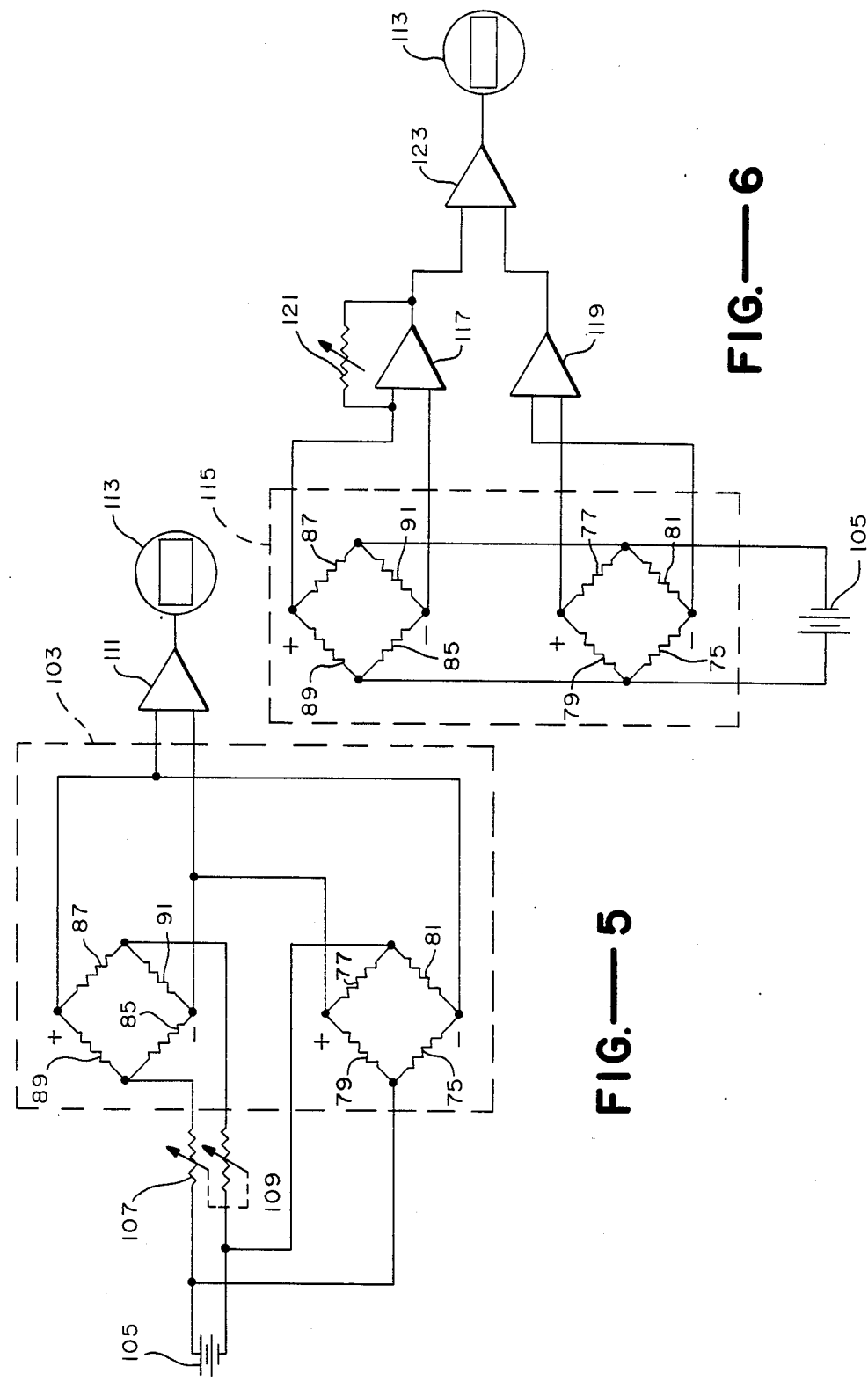

TEMPERATURE COMPENSATING PRESSURE GAGE

This invention relates to a pressure gage and more particularly a pressure gage for use in industries such as plastic extrusion wherein the gage is subjected to reatively wide temperature variations.

In the use of pressure gauges in the aforesaid environment it is recognized that the accuracy of the gauge varies considerably with the temperature of the extruded material. This variation is increased when attempts are made to cool the extruder by fan forced ventilation within a shroud since the pressure gage itself is subjected to the same flow of cooling air. It has been recognized that the reading error of pressure gages in such an environment has been only in the neighborhood of 15% to 20%.

It is, therefore, an object of the present invention to provide an improved pressure gage particularly suitable in a relatively variable temperature environment. Generally speaking, the pressure gage in accordance with the invention includes a body in which two force rods are employed rather than only one. One of the force rods is coupled to the source of pressure variation to be measured while the second, of a similar length and running parallel to the first, is separated from the force to be measured but still retained in the same body. The strain on the two rods is sensed by standard strain gauges. The total strain attributed to the rod coupled to the source of pressure variation, of course, includes the strain due to the measured pressure $\epsilon_p$. This total strain may also include a strain $\epsilon_t$ due to relative differences in the thermal expansion between the force rod and the body. Such differences will occur particularly when the body of the gage is first subjected to a change in temperature as in start up of an extruder. There may even be an additional strain, $\epsilon_x$, due to extraneous forces on the force rod. The total strain on this force rod, then, equals $\epsilon_p + \epsilon_t + \epsilon_x$. The strain attributed to the second force rod will only include that due to the relative thermal expansion $\epsilon_t$ and the extraneous forces $\epsilon_x$ for a total strain of $\epsilon_t + \epsilon_x$. When the measured strains attributed to the two rods are substracted the resultant is the strain attributed only to the measured pressure.

$$(\epsilon_p + \epsilon_t + \epsilon_x) - (\epsilon_t + \epsilon_x) = \epsilon_p$$

When an electrical signal representative of this difference is applied to a conventional high impedance meter, the measured pressure can be read directly.

Referring to the drawings,

FIG. 1 is a schematic view, partly in section, showing a pressure gage in accordance with the invention connected to a plastic extruder;

FIG. 2 is an enlarged sectional view of the pressure gage proper in accordance with the invention;

FIG. 3 is a detailed plan view of the pressure sensor as used in the pressure gage of FIG. 2;

FIG. 4 is an enlarged plan view of the temperature sensor as used in the pressure gage of FIG. 2;

FIG. 5 is a schematic diagram of the electrical interconnections describing one embodiment of the invention wherein temperature correction may be accomplished by adjusting the input voltage to one of the bridges; and FIG. 6 is a schematic diagram showing the electrical connection of another embodiment of the invention wherein temperature correction may be accomplished by adjusting the amplification output from one of the bridges.

Referring now to FIG. 1 there is shown the wall of a high pressure extruder 11 which may be filled with molten plastic 13, the pressure of which is to be measured. A pressure gage 15 in accordance with the invention is connected to the extruder 11 through an opening therein such that the end of the gage is essentially flush with the inside surface of the extruder 11. In order to provide some temperature regulation of the extruder a shroud 17 is provided thereabout and a blower 19 is connected to the shroud through an input opening 21. Air from the fan 19 is circulated about the space between the extruder 11 and the shroud 17 and is eventually exhausted through a vent 23. A shield 25 is provided about the gage 15 to provide some protection against temperature variations due to the air flow from the fan 19.

While the shield 25 provides some protection from the temperature variations from the fan, the accuracy of the gage is still not ideal and further compensation is provided in accordance with the invention as is shown more specifically in FIGS. 2 through 6.

Referring now specifically to FIG. 2, the gage 15 includes a hollow elongated body 27 having an externally threaded end 29 which is retained in the wall of the extruder 11. A shoulder 31 is formed on the end of the body 27 and cooperates with the shoulder 33 in the extruder wall to provide a metal to metal seal. It should be recognized that when the gage is screwed into the extruder wall to provide the metal to metal seal, the gage itself is subjected to compression by the force on the thread thereby somewhat distorting its overall length. While this distortion has been present in pressure gages of the prior art, the compression is compensated by the gage in accordance with the present invention as will be shown hereinafter.

A pressure force rod 35 is disposed within the body 27. The pressure force rod has a circular cross section end portion 37 at its lower end and another circular cross section end portion 39 at its upper end. Except for the two end sections 37 and 39 the cross section of the pressure force rod is semicircular. A temperature force rod 41 is also disposed within the body 27. The temperature force rod includes an annular end portion 43 at its upper end. Except for the annular end portion 43, the temperature force rod 41 is, like the pressure force rod 35, semicircular in cross section. The flat surfaces of the two force rods 35 and 41 lie adjacent each other such that the two, for the bulk of their length, combine to form a circular cross section assembly within the body 27.

A tip 45 is welded to the bottom of the body 27 as at 47 and includes a central stud 49 which is received in a circular bore at the bottom end 37 of the pressure force rod 35. As is noted in FIG. 2 the bottom of the force rod 35 is spaced from the inside of the tip 45 as is the bottom of the body 27 itself whereby a working area 51 is provided for the flexure of the tip 45 under the pressure of the plastic within the extruder 11.

The upper end 39 of the pressure force rod extends through an opening in the annular end 43 of the temperature force rod as well as through the central opening of a temperature sensor 53, to be defined hereinafter. A pressure sensor 55 includes a stud 57 received in a bore at the upper end 39 of the pressure force rod 35.

The temperature force rod 41 does not extend to the tip 51 but rather is restrained by a shoulder 59 on the body 27. The upper end of the temperature force rod 41 includes a bore not only to permit through passage of the pressure force rod 35 but also to receive an annular boss 63 of the temperature sensor 53.

As can be noted from FIG. 2, the temperature sensor 53 and the pressure sensor 55 are stacked above one another in an enlarged opening 64 in the body 27. An annular spacer 65 maintains the temperature sensor 53 off the bottom of the enlarged opening so as to provide a working space 67 permitting flexure of the sensor 53 itself. A similar spacer 69 is provided between the temperature sensor 53 and pressure sensor 55. The sensors 53 and 55 are retained against their respective spacers 67 and 69 and the force rods 35 and 41 are retained against the tip 45 and ring 59, respectively by pressure applied by a hollow stud 71 threaded in the body 27.

Thus it can be seen that the pressure rod 35 is held secure between the tip 45 and the pressure sensor 55 such that any application of pressure at the tip 45 is applied directly to the sensor 55. Similarly the temperature force rod 41 is held secure between the shoulder 59 and the temperature sensor 53 such that any expansion or contraction due to temperature or other forces is applied directly to the sensor 53. Thus it is seen that if both the pressure force rod 35 and the temperature force rod 41 are subjected to the same temperature variations relative to the body 27, the resultant thermal expansion due to those variations will be directed to their respective sensors 53 and 55. Likewise if the pressure force rod 35 and temperature force rod 41 are subjected to the same pressure variations such as will arise because of threading the body 27 tightly within the extruder wall 11, those variations will also be directed to both sensors 53 and 55.

Pressure sensor 55 includes a flat circular face 73 on which is secured a strain gage bridge diaphragm as shown in plan view in FIG. 3. A suitable strain gage bridge diaphragm has been found to be one manufactured and sold by Micromeasurements Division of the Measurements Group of Raleigh, N.C., under Model Number MA-06-364JB-350. The diaphragm includes outer compression sensors 75 and 77, as well as inner tension sensors 79 and 81.

The temperature sensor 53 also includes a flat face 83 which is annular in form and shown more clearly in FIG. 4. Two compression strain gages 85 and 87 are secured to the face 83 at the outer edges thereof and two tension strain gages 89 and 91 are secured to the face 83 at the inner portion thereof. It has been found that strain gages also manufactured by the Micromeasurement Division of the Measurements Group, specifically Model No. MA-06-031CE-350 are suitable.

The strain gages from the sensors 53 and 55 are connected by a cable 93 to power and measurement devices to be described hereinafter. Interconnection to the strain gages on the temperature sensor 53 is accomplished by wires passing through slots (not shown) in the wall of the pressure sensor 55.

The shield 25 is formed of a hollow tube 95 having a diameter somewhat larger than that of the body 27 and included a reduced diameter portion 97 sized to fit against the outer wall of the body 27. Set screws 99 may be used to secure the shield 25 to the body 27. Furthermore, the shield may include a cup 101 having an opening therein adapted to receive the lower portion of the body 27, the cup 101 serving to maintain consistent spacing between the shield and the body throughout their length.

Referring now to FIG. 5, the electrical connection of the gage shown in FIG. 2 is illustrated. In the schematic of FIG. 5 the entire portion within the dashed lines 103 is interconnected within the enlarged opening 64 of the strain gage shown in FIG. 2 and specifically on the sensors 53 and 55. In FIG. 5 the strain gages shown employ the same reference numerals as in FIGS. 3 and 4 and are shown to be connected as bridges. Input voltage from a battery or other source 105 is connected directly to the input of the bridge comprising the pressure sensing strain gages 75, 77, 79 and 81. The input voltage may also be applied directly to the temperature sensing gages 85, 87, 89 and 91. It is desirable in many instances, however, to provide the connection to the temperature sensing bridge through a pair of variable resistances 107, 109 such that the applied voltage to the temperature bridge (or alternatively to the pressure bridge) may be adjusted to compensate for relatively small temperature difference between the body 27 and the force rods 35 and 41 themselves. It should be recognized that even with the close spacial relationship of the body and force rods and the operation of the shield 95, the body may still be at a different temperature than the force rods. Compensation for these temperature differences can be made by adjusting the input voltage to one or the other of the strain gage bridges. The outputs of the strain gage bridges are applied in subtractive fashion to an amplifier 111 and from there to a high impedance meter 113 which is preferably of the digital type and may be calibrated to read the output of the bridge directly in terms of the pressure measured.

With such a system it is seen that any flexure of the pressure sensor 55, whether caused by variation in the relative temperature difference between the body 27 and the rod 35 or by additional forces such as applied to the threads 29 on the body 27, is compensated by a substantially identical temperature and force variation to the rod 41 relative to the body 27, as applied to the temperature sensor 53. Since the output of the bridge on the temperature sensor 53 is applied in subtractive fashion to the output of the bridge on the pressure sensor 55, the resultant difference in output of the two bridges is related almost entirely to the pressure applied to the tip 45.

While, as mentioned above, it is recognized that inaccuracy of pressure readings in the order of 15% to 20% have been found in the use of the pressure gages of the prior art in environments of relatively high temperature changes. Those inaccuracies have been reduced to as low as only 4% when using the pressure gage as defined above even without the shield 25 in place. With both the multiple force rods and the temperature shield inaccuracies have been reduced to 1%.

Referring to FIG. 6 an alternative embodiment of the invention is shown wherein a somewhat different compensating circuit is employed. In the embodiment of FIG. 6 compensation for possible temperature differences between the body 27 and the rods 35 and 41 is accomplished not by a variation of the input voltage to one of the bridges but rather the variation in the amplification of the output of one of the bridges. In the embodiment of FIG. 6 those connections within the dashed line 115 are within the pressure gage itself, as shown in FIG. 2 and particularly at the sensors 53 and 55. In the embodiment of FIG. 6 the application of voltage is applied directly to both bridges but the outputs of both bridges are passed to amplifiers 117 and 119 at least one of which is provided with a variable feedback loop 121 to adjust the amplification thereof for compensation purposes. The outputs of the amplifiers 117 and 119 are joined in subtractive fashion and applied to the amplifier 123 which, as in the embodiment of FIG. 5, serves to amplify bridge outputs for application to a high impedance meter 113.

What is claimed is:

1. In a pressure gage, an elongated body having an opening therethrough, a pressure sensitive tip secured across one end of said body and adapted to be placed in an environment of pressure to be measured, first and second sensors secured adjacent the opposite end of said body, a first force rod operably disposed between said tip and one of said sensors whereby pressure applied to said tip as well as variations in relative elongation of the body and said first force rod due to temperature differences and the like are applied to said sensor through said first force rod, a second force rod within said body and operably disposed between a fixed position at said one end of said body adjacent to but spaced from said tip and the other of said sensors whereby variations in relative elongation of the body and said second force rod due to temperature differences and the like are applied directly to said second sensor.

2. A pressure gage as defined in claim 1, together with means for measuring the difference in the outputs of said first and second sensors said difference providing a direct indication of the pressure applied to the tip essentially free from errors due to temperature variations of the pressure gage itself.

3. A pressure gage as defined in claims 1 or 2 together with a shield disposed about said body and, for a major portion of its length, spaced from said body whereby temperature variations due to air flow toward the body are shielded from the body itself.

4. A pressure gage as defined in claim 2, including means for adjusting the output of one of said sensor so as to compensate for variations in temperature between said force rods and said body.

5. A pressure gage as defined in claim 2, including means for adjusting the power input to one of said sensors so as to compensate for variations in temperature between said force rods and said body.

* * * * *